United States Patent [19]

Kawase

[11] 3,965,617

[45] June 29, 1976

[54] METHOD OF POTTING TREES AND SHRUBS

[76] Inventor: Makoto Kawase, 902 Ridgecrest Drive, Wooster, Ohio 44691

[22] Filed: Apr. 11, 1975

[21] Appl. No.: 567,055

[52] U.S. Cl. .................................. 47/58; 47/37
[51] Int. Cl.² ................................. A01G 23/02
[58] Field of Search ............ 47/34.11, 37–37.6, 47/58; 37/2 R, 2 P; 111/DIG. 1

[56] References Cited
UNITED STATES PATENTS

| | | | |
|---|---|---|---|
| 652,736 | 6/1900 | Balsley | 47/37 X |
| 2,064,707 | 12/1936 | Wilson | 47/34.11 |
| 2,669,065 | 2/1954 | Clegg | 47/37 |
| 2,770,076 | 11/1956 | Kluckhohn | 37/2 R X |
| 2,988,393 | 6/1961 | Logan | 47/37.1 X |
| 2,989,335 | 6/1961 | North | 37/2 R |
| 3,079,190 | 2/1963 | Hansen | 47/37.6 |
| 3,284,932 | 11/1966 | Wendlandt | 47/37 X |
| 3,471,192 | 10/1969 | Childs et al. | 47/37 X |
| 3,662,490 | 5/1972 | Childs | 47/37 |

FOREIGN PATENTS OR APPLICATIONS

| | | | |
|---|---|---|---|
| 28,420 | 10/1941 | India | 47/37 |

*Primary Examiner*—Edgar S. Burr
*Assistant Examiner*—James R. Feyrer

[57] ABSTRACT

A method to pot field-grown evergreen or hard-to-transplant trees and shrubs involving container growing, digging, and potting procedures. After a tree or shrub reaches nearly salable size in the field, hollow cylinder is pushed in the ground so that the major root system is contained in the cylinder. The cylinder is left in the soil for 4–12 months until new root system establishes in the cylinder. Shortly before shipping, the cylinder is dug with the roots and soil intact and inserted in a cylindrical pot, thus containing a ready-to-plant tree or shrub in a double-wall cylindrical pot.

10 Claims, 8 Drawing Figures

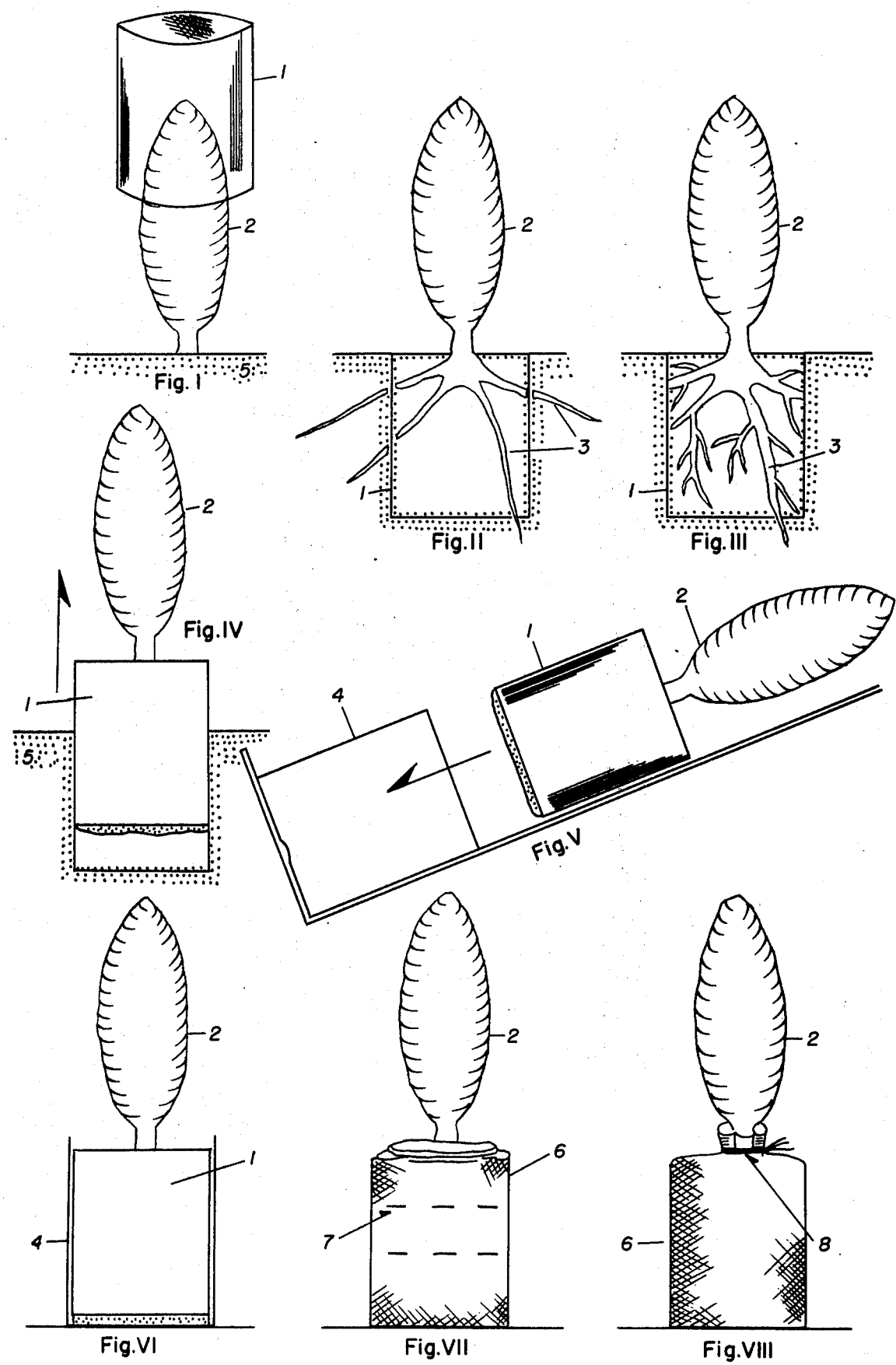

METHOD OF POTTING TREES AND SHRUBS

BACKGROUND OF THE PRESENT INVENTION

Presently, when a nurseryman wants to sell his tree or shrub, he must dig the plant out of the ground with the root system of the plant as intact as possible. Next he must protect the root system. Some deciduous trees or shrubs can be dug up during the dormant season bare-rooted, moved with minimum protection, and transplanted successfully.

However, evergreen trees and shrubs and deciduous trees and shrubs in the growing season must be moved with some amount of soil attached to the plants in which the root systems are kept intact. The success of transplanting trees and shrubs depends on the existence of healthy root systems.

In order to move a tree or shrub, the ball-and-burlap method, the container growing method, and tree moving machine methods are commercially available.

According to the ball-and-burlap method, a trench must be dug around a tree. The circumference and depth of the trench depend on the size and kind of the tree. Then, the soil ball within the trench must be separated from the ground at its base. The ball of earth is held in place by wrapping it with burlap securely tied with rope. This method is time consuming and expensive because it can only be done by experienced workers. The ball-and-burlap method is not always successful. When root system of a plant spreads thinly into the ground, the ball-and-burlap method removes the plant out of the ground with only a few short-cut thick roots which eventually can not support or feed the entire plant. Thus, a few years prior to the ball-and-burlap operation, tree roots are often pruned by digging trench around the tree, in such a manner that digging is done for one third of the trench in the first year, next one third in the second year, and finally the last one third in the third year. This root pruning encourages dense root formation inside the trench inner boundry. The balled-and-burlapped plants prepared after root pruning have almost 100% success in transplanting.

The soil ball is easily broken and this would result in root damage. Thus, the ball-and-burlap method can not be mechanized. There are many other shortcomings to this method. The soil ball is heavy to handle, easily broken, and difficult to maintain at the garden center because burlap often decomposes at inopportune times.

The so-called container-grown trees and shrubs are easy to handle at nurseries and garden centers. To grow trees and shrubs in containers, small plants are planted in metal or plastic containers with special media. Several disadvantages accrue from this method. Intensive care must be given to the plants until plants attain salable size. This may be for 1-2 years or longer. Since container-grown plants have no contact with the ground which would otherwise provide water and nutrients to field-grown plants, these trees and shrubs must be fed at least 1-2 times daily with water and nutrients. Secondly, pest problems are prevalent among these because plant density is high. Thirdly, plants are kept in a high moisture environment due to frequent watering. This also makes plants more vulnerable to disease. The greatest difficulty in the method is overwintering during the winter season, particularly in mid to northern United States. Plant roots are very sensitive to low temperature - even 32° F is fatal in many cases. The root system of field-grown plants are protected by mother earth. But container-grown plants must be kept in greenhouses or plastic houses often employing heating devices during the winter season. The energy crisis makes this situation undesirable. Plants in containers also suffer from Summer heat. Temperature of containers often rises so high that it causes the reduction of growth in root and stem.

Several kinds of tree movers, which dig and carry trees to pre-dug holes, have been commercially available. The U.S. Pat. No. 3,284,932 (E. A. Wendlandt) describes a device to dig a tree with a cylindrical soil ball. Tree movers or such a tree digger are only good for the moving of trees for a short distance.

In addition, the U.S. Pat. No. 3,662,490 (R. S. Childs) describes a method to dig a tree with a cylindrical soil ball and place a cylindrical sleeve around the ball. A disc is then fastened to the base of the sleeve to make a bottom.

The U.S. Pat. No. 3,154,884 (S. S. Amar et al.), U.S. Pat. No. 1,634,727 (W. O. Roy), and U.S. Pat. No. 3,828,473 (D. H. Morey) describe methods to grow plants in bottom-less containers. Vegetable seeds are planted in containers which have been inserted in the soil (Amar et al.), plants are planted in tubes with soil and then the tubes are inserted in the soil (Roy), or a plant is planted in a tube with special medium; the plant is pushed out of the tube into a pre-dug hole in the ground after the plant reaches the certain size (Morey).

In short, nothing has described a method to grow trees and shrubs in hollow cylinders which are inserted into the ground around the root system after trees and shrubs reach nearly salable size. There has been no simple method to pot a plant in which root system is enclosed in a hollow cylinder.

SUMMARY OF THE PRESENT INVENTION

One object of the invented method is to make digging, potting, and handling of trees, shrubs and other plants easier and cheaper while avoiding the disadvantages of earlier method such as:

Container growing method- need of frequent watering and feeding, frequent pest sprays, expensive overwintering, inherently poor growth.

Ball-and-burlap method- time consuming, need of experienced worker, difficulty in mechanization for mass production, high plant shock risk resulting in plant loss.

Tree mover- limitation in distance of tree moving, poor establishment of plants after transplanting.

Tree digger- time consuming, complicated operation in digging and potting, poor establishment of plants after transplanting.

One phase of this invention refers to a method to insert a hollow cylinder into the ground around the root system of a tree or shrub after the tree or shrub reaches nearly salable size and to leave the cylinder in the soil for 4-12 months until digging.

The insertion of thin-wall cylinder least alters the physical condition of the soil within the cylinder. The roots within the cylinder, thus, can sustain the shock caused by the cylinder insertion. Besides, some roots which are extending below the cylinder remain intact in undisturbed soil. Therefore, the shock due to the cylinder insertion is less harmful than the shock caused by ball-and-burlap operation, tree digger, or tree movers.

The importance which makes this invented method different from the earlier methods is not only in the time when plants are contained in cylinders but also in a concept of plant growing. When a plant is planted in a narrow container, its growth is definitely controlled by the size of the container. Field-grown tree or shrub, on the other hand, have ample space to develop a good root system which in turn produces a well developed trunk and crown. Such a balance between root and above-ground part is commonly observed in the plant kingdom. Thus, when cylinder insertion cuts roots, dense root formation in the cylinder is stimulated to counterbalance the heavy top. Such a stimulation of root growth in the cylinder is helped by the undisturbed soil structure in the cylinder and many intact roots in the soil below the cylinder as described earlier. Therefore, a plant raised according to the invented cylinder culture method, has not only a bigger top growth but also a better root system than any container-grown plant. The cylinder cultured plant is also easier to establish in a new location than those moved with a ball-and-burlap method or by tree-digging machines because of its dense root system.

Although any specific machine is not invented nor suggested by this inventor, trees and shrubs raised according to this invented method are very easy to dig with the soil and plant intact inside the cylinder. Any undercutter and fork attached to a farm tractor cuts root systems below the cylinders, lift the cylinders, and place the cylinders on their sides on the ground. Such a reduced time in digging could reduce the number of plants that must be kept in the inventory of a nurseryman.

Another phase of this invented method is to pot a cylinder cultured plant. Once a tree or shrub is dug out with the soil and roots intact in the cylinder, the cylinder is placed in a cylindrical pot which is slightly larger in size than the cylinder. The potting operation is thus very simple. Cylinder cultured plants prepared according to this invented method have a double layer of wall which is a better protection against root damage during transportation.

BRIEF DESCRIPTION OF THE DRAWINGS

FIG. I describes the insertion of a hollow cylinder 1 into the ground 5 around the root system of field-grown tree 2 or shrub 2.

FIG. 11 describes the cylinder 1 immediately after insertion into the ground 5. Please note that most of the root system 3 is contained inside the cylinder, however, some roots 3 are cut by insertion of cylinder.

FIG. III describes the root system inside the cylinder, 4–12 months after the insertion of cylinder 1. Please note the densely developed root system inside the cylinder.

FIG. IV schematically describes digging of cylinder with the soil and root system intact, out of the ground.

FIG. V describes potting operation of the cylinder 1 into a cylindrical pot 4.

FIG. VI describes a finished cylinder cultured plant in double wall pot.

FIG. VIII describes a finished cylinder culture plant in a bag or being wrapped. Please note that the bag 6 or wrapping material 6 is fastened to the cylinder 1 with staples 7.

FIG. VIII describes the finished cylinder culture plant in a bag or being wrapped. Please note that the bag 6 or wrapping material 6 is tied above the top of the cylinder 8.

BRIEF DESCRIPTION OF THE PREFERRED FORMS OF THE INVENTION

The method for growing trees and shrubs in hollow cylinders comprises the following steps: (a) Growing tree 2 or shrub 2 in the field until the plant reaches salable size or proper size for transplanting. (b) Insertion of a hollow cylinder 1 vertically in the ground 5 around the root system of the plant (FIG. I). The cylinder is first slid down around the crown of plant towards the ground. Pressing branches and leaves aginst te trunk helps this sliding. The cylinder must be oriented so that the cylinder center approximately meets with the main trunk of the plant. Then, the cylinder is pushed into the ground until the upper rim of the cylinder slightly, 1–2 inches, sinks in the ground so that regular nursery operations such as cultivation and pesticide sprays do not damage the cylinder. Insertion of cylinder naturally cuts some of roots, particularly those extending in horizontal direction (FIG. II). Insertion of cylinder is easy with sandy soil and small cylinders. However, a big-sized tree or shrub requires a cylinder of larger diameter and greater depth. Insertion of large and deep cylinders into the ground, particularly into a heavy soil, is difficult. Development of some devices to cut a narrow circular trench around the root system is recommendable. Such a device is helpful in inserting the cylinders, particularly fragile plastic cylinders. (c) Leaving the cylinder in the ground for 4–12 months until new dense root system establishes inside the cylinder (FIG. III). This is one of the most important steps for this invented cylinder culture method to ensure a successful establishment of tree or shrub in a new location after transplanting. Duration of waiting period should be decided depending on many factors such as season, kind of plant, health of plant, soil condition, and on whether plants underwent root pruning or not. A longer waiting period is needed in Winter season than in Summer season, for coniferous plants than for deciduous plants, for non-root-pruned plants than root-pruned ones. Four months in growing season in Ohio are probably sufficient. In general, if the cylinders are inserted into the ground in Spring, or in Fall, cylinders are ready for digging in the following Fall or Spring, respectively.

Preferred cylinder materials are metal, plastic, or any other suitable material. Size of cylinders depends on the size and kind of a plant. Some shrubs like azaleas and rhododendrons require wide but shallow cylinders because of their rooting habit. Three sizes of cylinders such as 6 inches inside diameter × 8½ inches height, 8 inches inside diameter × 9½ inches height, and 10 inches inside diameter × 12 inches height, probably satisfactory for general use for small trees and shrubs. When polyethylene plastic cylinders are used, wall thickness of 1.6 mm would be satisfactory for the sizes of cylinders described above. The wall thickness must be increased with the increase in the size of cylinders. For tin cylinder, about 0.2 mm of thickness is satisfactory for the three sizes described above. In a very heavy soil, there is a problem of poor air exchange between atmosphere and cylinder. Gas exchange holes, 1 inch diameter, on the cylinder wall minimize this problem. However, holes more than 4 inches would not be recommended because they weaken the physical strength of cylinders.

The method to pot the cylinder cultured plants is made up of the following steps: (a) Digging the cylinder, with the soil and plant intact, out of the ground. The operation is schematically illustrated in FIG. IV. Digging out of the cylinder must be preceded by cutting roots which are growing below the cylinder base. In a nursery row, cylinder digging is accomplished with an undercutter and a fork attached to a tractor, the undercutter cutting roots below the cylinders and fork lifting and placing cylinders on their sides on the ground. (b) Insertion of the cylinder with the soil and plant intact, into a cylindrical pot which has a bottom (FIG. V). The pot should be slightly larger than cylinder in size so that the cylinder fits inside the pot smoothly but not too loosely. The height of pot should be higher than the cylinder by 1-2 inches. Even if some of roots and soil mass remain attached to the cylinder base after digging, the pot should be able to contain the cylinder within the pot. The extra height of the pot above the cylinder assists handling and watering of the cylinder cultured plant as shown in FIG. VI. (c) After insertion into the pot, the plant is ready for movement to a transporting site or shipment for sale (FIG. VI).

The preferred pot material is metal, plastic, pressed fiber, or any other suitable material. The pot should have one or more drain holes at or near the bottom. When polyethylene plastic is used, 0.8 mm of pot wall thickness is sufficient for the cylinder sizes described earlier, however, the wall thickness should be increased with the increase of pot size.

Modification of the potting method: Cylinders 1 can be placed in a bag 6 made of plastic, burlap, or any other suitable material. The bag can be fastened to the cylinder 1 with staple 7 or any other suitable device. Or, the mouth of the bag is tied above the cylinder rim with twine, wire, or any other suitable material 8 (FIG. VII and VIII).

Another modification of the potting method: The cylinder can be wrapped with plastic sheet, burlap, or any other suitable material 6. The wrapping material can be fastened to the cylinder with staple 7 or any other suitable device. Or, wrapping material is tied above the cylinder's upper rim with twine, wire, or any other suitable material (FIG. VII and VIII).

Modification of the shape of hollow cylinder and cylindrical pot: Rectangular top-less and bottom-less box and rectangular pot can be used in stead of hollow cylinder and cylindrical pot. General procedures for growing of plants in the box and potting of box-grown plants are similar to the cylinder culture method and their drawings are not shown in this application. Material and thickness of the box or rectangular pot are similar to those shown for the cylinder culture method. Three sizes of boxes would be satisfactory for the general use for small trees and shrubs and they are 5×5×9 inches (width × length × height), 7×7×9½, and 9×9×11½.

What is claimed is:

1. The method of containerizing a field grown plant in a tubular container open at both ends comprising the steps of:
   A. Placing the container over the plant crown and around the plant to rest on the soil surface after the plant has at least substantially reached a salable size,
   B. Driving the container into the soil until the top of the container is at least level with the soil surface,
   C. Allowing the container and contents to remain in the soil approximately from 4 to 12 months,
   D. Removing the container and its contents from the soil,
   E. Placing the container and its contents in an outer container which has a bottom and is slightly larger than said first container.

2. The method of containerizing a plant of claim 1, which further comprises the step of wrapping said first container and its contents with a suitable material.

3. The method of containerizing a plant of claim 1, which further comprises the step of placing said first container and its contents in a suitable bag.

4. The method of containerizing a plant of claim 1, which further comprises the step of forming at least one hole on said first container.

5. The method of containerizing a plant of claim 1, which further comprises the step of forming at least one hole on said outer container.

6. The method of containerizing a plant of claim 2, which further comprises the step of tying said wrapping material together above the top of said first container.

7. The method of containerizing a plant of claim 3, which further comprises the step of tying said bag together above the top of said first container.

8. The method of containerizing a plant of claim 1, which further comprises the step of fastening said outer container to said first container.

9. The method of containerizing a plant of claim 2, which further comprises the step of fastening said wrapping material to said first container.

10. The method of containerizing a plant of claim 3, which further comprises the step of fastening said bag to said first container.

* * * * *